(12) United States Patent
Chang et al.

(10) Patent No.: US 10,667,161 B2
(45) Date of Patent: *May 26, 2020

(54) COMMUNICATION CONTROL METHOD (71) Applicant: KYOCERA CORPORATION, Kyoto (JP)

(72) Inventors: Henry Chang, San Diego, CA (US); Noriyoshi Fukuta, Yokohama (JP)

(73) Assignee: KYOCERA Corporation, Kyoto (JP)

(*) Notice: Subject to any disclaimer, the term of this patent is extended or adjusted under 35 U.S.C. 154(b) by 56 days.

This patent is subject to a terminal disclaimer.

(21) Appl. No.: 15/989,620

(22) Filed: May 25, 2018

(65) Prior Publication Data

US 2018/0279153 A1 Sep. 27, 2018

Related U.S. Application Data

(63) Continuation of application No. 14/355,950, filed as application No. PCT/JP2012/078894 on Nov. 7, 2012, now Pat. No. 9,992,698.

(Continued)

(51) Int. Cl.
*H04W 24/10* (2009.01)
*H04W 16/18* (2009.01)
(Continued)

(52) U.S. Cl.
CPC .......... *H04W 24/10* (2013.01); *H04W 16/18* (2013.01); *H04W 64/00* (2013.01); *H04W 24/04* (2013.01)

(58) Field of Classification Search
None
See application file for complete search history.

(56) References Cited

U.S. PATENT DOCUMENTS

2009/0253452 A1 10/2009 Kato
2011/0130135 A1 6/2011 Trigui
(Continued)

FOREIGN PATENT DOCUMENTS

JP 2004-221710 A 8/2004
JP 2007-134812 A 5/2007
(Continued)

OTHER PUBLICATIONS

An Office Action; "Notice of Reasons for Rejection," issued by the Japanese Patent Office dated Jan. 13, 2015, which corresponds to Japanese Patent Application No. 2013-543016 and is related to U.S. Appl. No. 14/355,950; with English language statement of relevance.

(Continued)

*Primary Examiner* — Rebecca E Song
(74) *Attorney, Agent, or Firm* — Studebaker & Brackett PC (57) ABSTRACT

A communication control method used in a mobile communication system supporting immediate MDT (Minimization of Drive Test) includes a user terminal in a radio resource control (RRC) connected state in a cell of the base station receiving an instruction from a base station, acquiring, in the RRC connected state, location information indicating a location of the user terminal based on the instruction from the base station, and measuring an uplink packet delay of uplink communication with the base station. The radio access bearers of the user terminal are associated with Quality of Service (QoS) characteristics to perform QoS control. The user terminal in the RRC connected state compares the measured uplink packet delay with a packet delay threshold value and determines whether to transmit a report to the base station based on result of the comparison. The report indicates the measured uplink packet delay.

3 Claims, 9 Drawing Sheets

Related U.S. Application Data (60) Provisional application No. 61/556,407, filed on Nov. 7, 2011.

(51) Int. Cl.
*H04W 64/00* (2009.01)
*H04W 24/04* (2009.01)

(56) References Cited

U.S. PATENT DOCUMENTS

| | | | |
|---|---|---|---|
| 2011/0201279 A1* | 8/2011 | Suzuki | H04W 24/10 455/67.11 |
| 2011/0242980 A1 | 10/2011 | Bader | |
| 2012/0087259 A1 | 4/2012 | Kim et al. | |
| 2012/0236805 A1* | 9/2012 | Kuo | H01Q 21/28 370/329 |
| 2013/0084809 A1 | 4/2013 | Johansson et al. | |
| 2013/0095860 A1 | 4/2013 | Hapsari et al. | |
| 2013/0114446 A1* | 5/2013 | Liu | H04W 24/10 370/252 |
| 2013/0176871 A1 | 7/2013 | Bertze et al. | |
| 2014/0087716 A1* | 3/2014 | Vaderna | H04L 43/50 455/422.1 |
| 2014/0169320 A1 | 6/2014 | Yi et al. | |
| 2014/0349583 A1 | 11/2014 | Bodog et al. | |

FOREIGN PATENT DOCUMENTS

| | | |
|---|---|---|
| JP | 2007-318579 A | 12/2007 |
| JP | 2011-223120 A | 11/2011 |

OTHER PUBLICATIONS

Vodafone et al.; "MDT Requirements for QoS Improvements"; 3GPP TSG RAN WG2 #76; R2-115909; Nov. 14-18, 2011; San Francisco, USA.

International Search Report; PCT/JP2012/078894; dated Dec. 4, 2012.

3GPP TS 37320 V10.2.0 (Jun. 2011); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10).

3GPP TR 36.805 V9.0.0 (Dec. 2009); 3rd Generation Partnership Project; Technical Specification Group Radio Access Network; Study on Minimization of drive-tests in Next Generation Networks; (Release 9).

* cited by examiner

COMMUNICATION CONTROL METHOD

CROSS-REFERENCE TO RELATED APPLICATIONS

This application is a Continuation of U.S. patent application Ser. No. 14/355,950 filed May 2, 2014, which is the U.S. National Phase Application of International Application No. PCT/JP2012/078894 filed Nov. 7, 2012, which claims benefit of U.S. Provisional Application No. 61/556,407 filed Nov. 7, 2011, the entire contents of which are incorporated herein by reference.

TECHNICAL FIELD

The present disclosure relates to a mobile communication method and a user terminal used in a mobile communication system supporting MDT (Minimization of Drive Test) defined in the 3GPP (3rd Generation Partnership Project) standard.

BACKGROUND ART

In a mobile communication system, a radio communication environment around a base station changes when a building is constructed near the base station or installation conditions of its neighboring base stations change. Hence, it has been a common practice to perform a drive test where an operator uses a measurement vehicle carrying measurement equipment to measure states of signals received from a base station and collect measured data.

Although such measurement and collection are useful in optimizing coverage of the base station, for example, it has a problem of requiring a large number of man-hours and high cost. In view of this problem, 3GPP (3rd Generation Partnership Project) which is a standardization project of mobile communication systems is formulating a specification of MDT (Minimization of Drive Tests) for automating the measurement and collection by use of a user terminal held by a user (refer to Non-patent documents 1 and 2).

PRIOR ART DOCUMENT

Non-Patent Document

Non-patent document 1: 3GPP TR 36.805 V9.0.0
Non-patent document 2: 3GPP TR 37.320 V10.2.0

SUMMARY

It is important to verify not only received signal state from a base station but also QoS (Quality of Service) of communications with the base station in order to improve user experience besides the coverage optimization.

However, there is a problem that the current MDT specification has no mechanism for verifying the QoS.

Thus, the present disclosure provides a communication control method and user terminal capable of verifying the QoS by MDT manner.

A communication control method used in a mobile communication system supporting immediate MDT (Minimization of Drive Test) comprises a user terminal in a radio resource control (RRC) connected state in a cell of the base station receiving an instruction from a base station, acquiring, in the RRC connected state, location information indicating a location of the user terminal based on the instruction from the base station, and measuring an uplink packet delay of uplink communication with the base station. The radio access bearers of the user terminal are associated with Quality of Service (QoS) characteristics to perform QoS control. The user terminal in the RRC connected state compares the measured uplink packet delay with a packet delay threshold value and determines whether to transmit a report to the base station based on result of the comparison. The report indicates the measured uplink packet delay.

A user terminal that establishes a connection with a base station in a mobile communication system supporting immediate MDT (Minimization of Drive Test) comprises a controller containing a processor configured to cause the user terminal to execute processes of receiving an instruction from a base station while in a radio resource control (RRC) connected state in a cell of the base station, acquiring, while in the RRC connected state, location information indicating a location of the user terminal based on the instruction from the base station, and measuring an uplink packet delay of uplink communication with the base station. The radio access bearers of the user terminal are associated with Quality of Service (QoS) characteristics to perform QoS control. While in the RRC connected state the user terminal compares the measured uplink packet delay with a packet delay threshold value, and determines whether to transmit a report to the base station based on result of the comparison. The report indicates the measured uplink packet delay.

DESCRIPTION OF THE EMBODIMENTS

An embodiment of the present disclosure will be described with reference to the drawings. In the following drawings of the embodiment, same or similar reference signs denote same or similar portions.

Summary of Embodiment

A communication control method according to an embodiment is used in a mobile communication system supporting MDT (Minimization of Drive Test). The communication control method includes: a step A of transmitting location information indicating a location of a user terminal establishing a connection with a base station, from the user terminal to the base station, based on an instruction from the base station; and a step B of measuring, by the base station receiving the location information from the user terminal, a throughput of communication with the user terminal. This enables QoS verification about how throughput is obtained at which location, thereby it is possible to contribute the optimization for improving user experience. Such QoS verification enables to identify areas where QoS deteriorates.

In the embodiment, in the step B, the base station measures a throughput of communication with the user terminal per unit time. The communication control method further includes a step C of associating the location information received from the user terminal with the throughput measured in the unit time corresponding to a reception timing of the location information. This enables to identify about how throughput is obtained at which location, with a high degree of accuracy.

In the embodiment, in the step B, the base station individually measures an uplink throughput in the communication with the user terminal and a downlink throughput in the communication with the user terminal when the base station receives the location information from the user terminal. This enables QoS verification for each of uplink and downlink. Especially, it is useful for a mobile communication system adapting communication schemes (radio access scheme) are different in uplink and downlink.

In the embodiment, in the step B, the base station measures a throughput per user terminal when the base station receives the location information from each of plural user terminals establishing connections with the base station. This enables to QoS verification for each of plural user terminals.

In the embodiment, in the step B, the base station measures a throughput per radio access bearer of the user terminal when the base station receives the location information from the user terminal. The each radio access bearer is subject to QoS control based on the QoS characteristic of radio access bearer. Therefore, this enables QoS verification about whether the QoS characteristic is satisfied for each radio access bearer.

In the embodiment, the method further includes: a recording step of recording location information indicating a geographical location of a user terminal by the user terminal in a connected state, during a period in which throughput of communication between the user terminal and a network is deteriorated; and a reporting step of reporting the location information recorded in the recording step to the network by the user terminal after restoration of the throughput. Here, throughput may indicate any of uplink throughput and downlink throughput.

In the embodiment, the method further includes a notification step of notifying the user terminal of a network time by the network when performing initial setting for in the user terminal.

In the embodiment, the method further includes: a deterioration detection step of detecting the deterioration in the throughput by the network; and a request transmission step of sending the user terminal a request for recording the location information from the network, upon detection of the deterioration in the throughput in the deterioration detection step. In the recording step, the user terminal starts recording of the location information in response to the recording request from the network.

In the embodiment, the network notifies the user terminal of a network time in the request transmission step.

In the embodiment, the method further includes: a restoration detection step of detecting the restoration of the throughput by the network; and a request transmission step of sending the user terminal a request for reporting the location information from the network, upon detection of the restoration of the throughput in the restoration detection step. In the recording step, the user terminal ends recording of the location information upon receipt of the reporting request from the network, and in the reporting step, the user terminal reports the location information recorded in the recording step to the network in response to the reporting request from the network.

In the embodiment, the method further includes a deterioration detection step of detecting the deterioration in the throughput by the user terminal. In the recording step, the user terminal starts recording of the location information upon detection of the deterioration in the throughput in the deterioration detection step.

In the embodiment, the method further includes: a step of sending the network a request for notification of a network time from the user terminal upon detection of the deterioration in the throughput in the deterioration detection step; and a step of notifying the user terminal of a network time by the network in response to the notification request from the user terminal.

In the embodiment, the method further includes a restoration detection step of detecting the restoration of the throughput by the user terminal. In the recording step, the user terminal ends recording of the location information upon detection of the restoration of the throughput in the restoration detection step, and in the reporting step, the user terminal reports the location information recorded in the recording step to the network upon detection of the restoration of the throughput in the restoration detection step.

In the embodiment, in the recording step, the user terminal records time information including the network time and a relative time based on the network time, in association with the location information, and in the reporting step, the user terminal reports the location information and the time information recorded in the recording step to the network.

In the embodiment, the method further includes: a step of recording a measurement result of the throughput in association with a network time by the network; and a step of associating the measurement result of the throughput with the location information according to the time information by the network, after receiving the location information and the time information reported in the reporting step.

In the embodiment, the network (the eNB, MME, or OAM) associates location information and a measurement result of the throughput assumed to have been acquired in the same time period, according to a combination of the location information and the time information included in the report from the user terminal, and a combination of the measurement result of the throughput and the network time recorded by the network.

In the embodiment, in the recording step, the user terminal records the measurement result of the throughput and the time information including the network time and the relative time based on the network time, in association with the location information, and in the reporting step, the user terminal reports the measurement result of the throughput, the location information, and the time information recorded in the recording step to the network.

In the embodiment, the deterioration in the throughput refers to a state where the throughput becomes lower than a predetermined threshold, or a state where the throughput becomes lower than a throughput range estimated from the number of resource blocks and an MCS (Modulation and Coding Scheme) applied to communication between the user terminal and the network.

(Configuration of Mobile Communication System)

Figure 1:
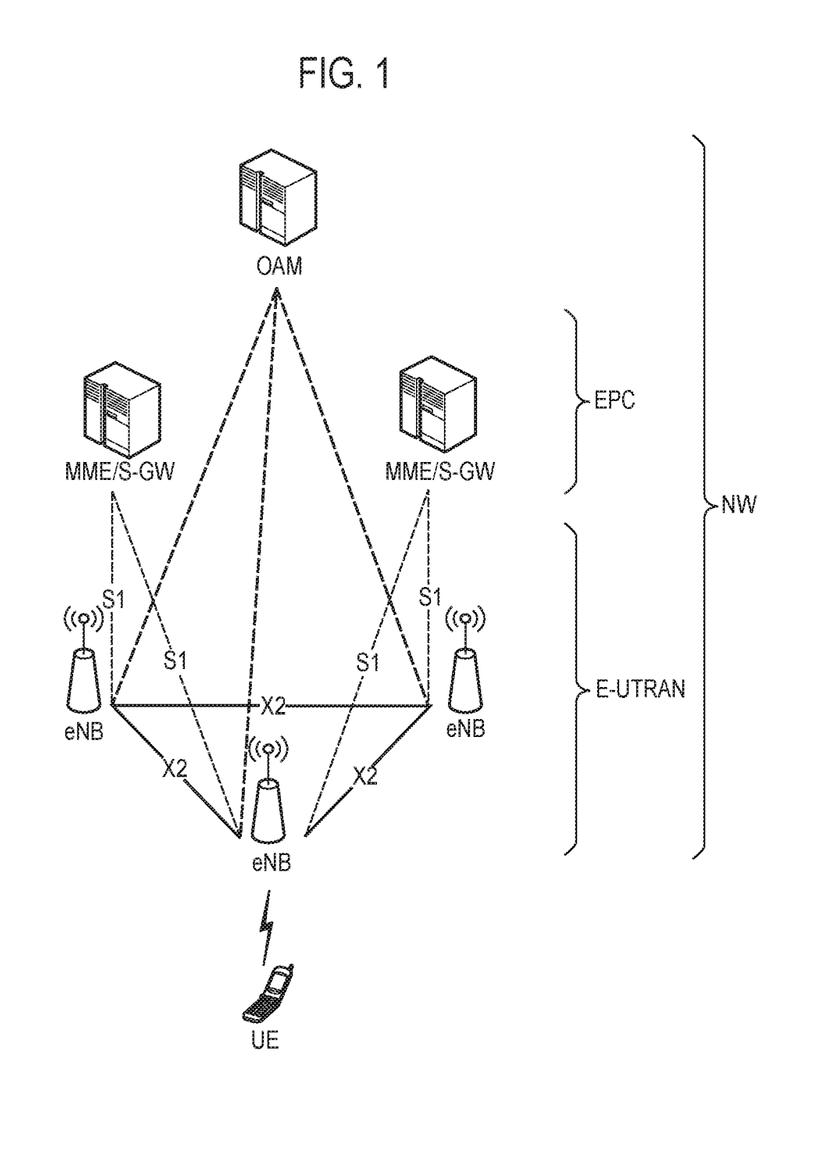
FIG. 1 shows a mobile communication system of an embodiment of the present disclosure.

FIG. 1 shows the mobile communication system of the embodiment. The mobile communication system has a configuration based on 3GPP standard (especially, LTE). In the mobile communication system, as radio access scheme, SC-FDMA scheme is applied to an uplink and OFDMA scheme is applied to a downlink.

As shown in FIG. 1, the mobile communication system includes multiple base stations (evolved Node-B: eNB) and a user terminal (User Equipment: UE) connecting to one of the eNBs. The multiple eNBs form an E-UTRAN (Evolved-UMTS Terrestrial Radio Access Network) which is a radio access network of LTE. Each eNB manages one or multiple cells. A cell is identified by a cell ID. A UE is allocated a radio resource by a cell to which it is connected (called serving cell) when it is in a connected (RRC Connected) state. In the mobile communication system, an X2 interface which is a logical communication channel for interconnecting neighboring eNBs is established. Additionally, an S1 interface which is a logical communication channel for connecting with an EPC (Evolved Packet Core) being a core network of LTE is established between the EPC and the eNB, as well as between the EPC and the eNB. The EPC includes an MME (Mobility Management Entity) and an S-GW (Serving Gateway). The MME manages a TA and/or a cell in which the UE is located, and performs various kinds of mobility management for the UE. The S-GW controls transfer of user data received by and sent from the UE. The mobile communication system further includes an OAM (Operation and Maintenance) for maintenance and monitoring of an E-UTRAN 10. In the embodiment, the E-UTRAN, the EPC, and the OAM form a network (NW).

Each UE in connected state establishes one or more radio access bearers with eNB. The each radio access bearer is subject to QoS control based on the QoS characteristic corresponding to the radio access bearer, in network (especially, in eNB).

Figure 2:
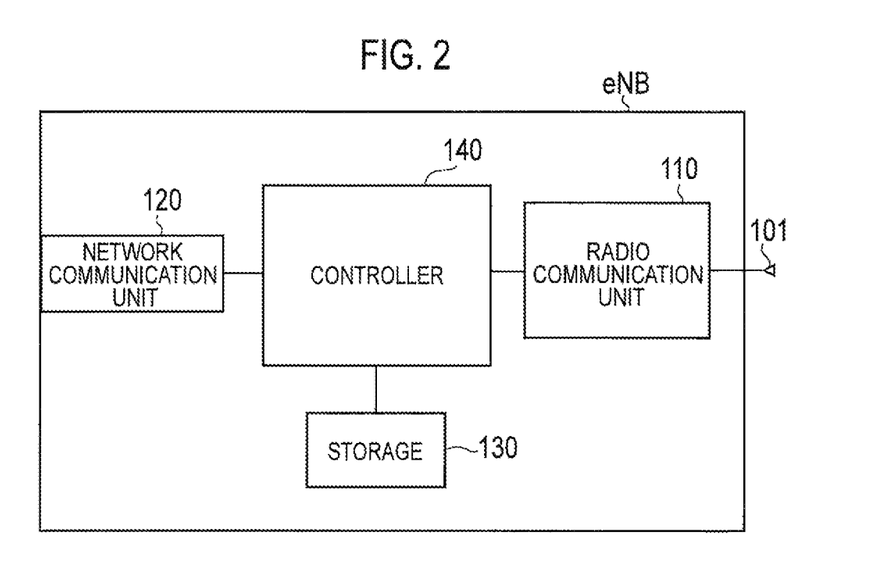
FIG. 2 is a block diagram of an eNB of the embodiment of the present disclosure.

FIG. 2 is a block diagram of the eNB. As shown in FIG. 2, the eNB includes an antenna 101, a radio communication unit 110, a network communication unit 120, a storage 130, and a controller 140. The antenna 101 is used for transmission and reception of radio signals. The radio communication unit 110 is formed of a radio frequency (RF) circuit, a baseband (BB) circuit and the like, for example, and exchanges radio signals via the antenna 101. The network communication unit 120 performs inter-base station communication with a neighboring eNB over the X2 interface. The network communication unit 120 also communicates with the EPC over the S1 interface. The storage 130 stores therein various kinds of information used for control and the like of the eNB. The controller 140 controls various functions (to be described later in detail) of the eNB.

Figure 3:
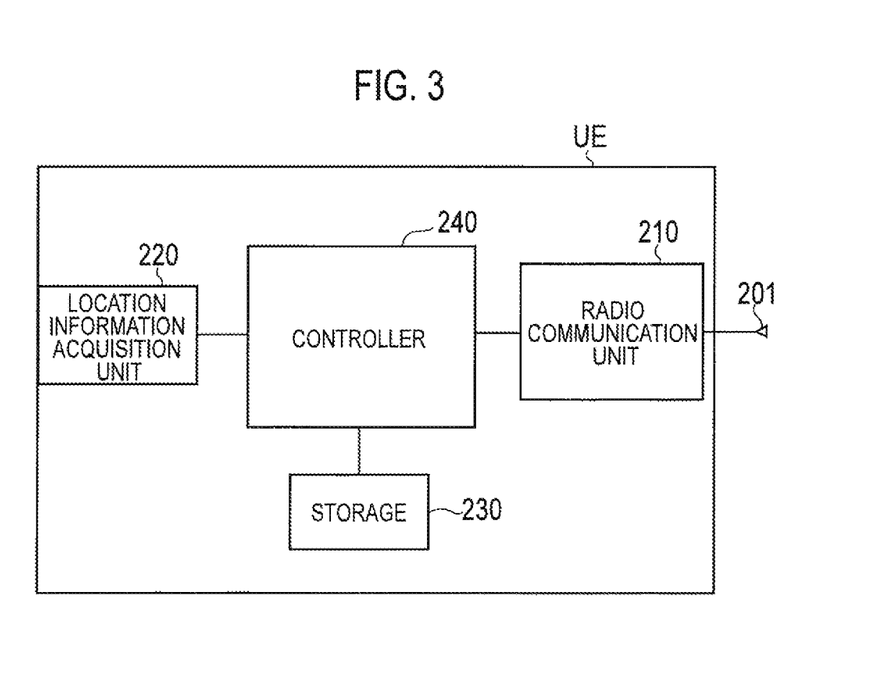
FIG. 3 is a block diagram of a UE of the embodiment of the present disclosure.

FIG. 3 is a block diagram of the UE. As shown in FIG. 3, the UE includes an antenna 201, a radio communication unit 210, a location information acquisition unit 220, a storage 230, and a controller 240. The antenna 201 is used for transmission and reception of radio signals. The radio communication unit 210 is formed of an RF circuit, a BB circuit and the like, for example, and exchanges radio signals via the antenna 201. The location information acquisition unit 220 includes a GPS receiver, for example, and outputs location information based on received GPS signals to the controller 240. The storage 230 stores therein various kinds of information used for control and the like of the UE. The controller 240 controls various functions (to be described later in detail) of the UE.

(Operation of Mobile Communication System)

Hereinafter, a description is given of operations of the mobile communication system of the embodiment.

Figure 4:
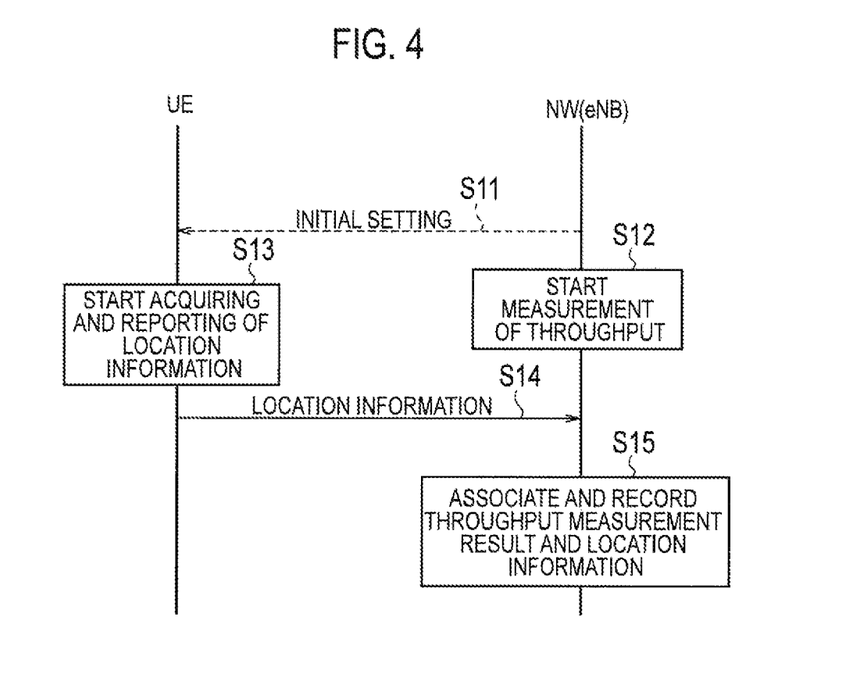
FIG. 4 shows basic operation pattern of the mobile communication system of the embodiment of the present disclosure.

First of all, a description is given of a basic operation of the mobile communication system of the embodiment. FIG. 4 shows the basic operation pattern of the mobile communication system. In the initial state of this operation, the UE is a state connected to the eNB (connected state). MDT which is applied to the connected state UE is called Immediate-type MDT (Immediate MDT).

As shown in FIG. 4, is step S11, the eNB performs initial setting for communicating with the UE or performs initial setting for MDT. The initial setting includes instruction information for instructing a transmission (a report) of location information indicating the geographic location of the UE. The UE receives initial setting information including the instruction information.

In step S12, the eNB starts the measurement of throughput of communication with the UE. The throughput is measured at a layer 2 (L2) of the eNB. The eNB measures the throughput of communication with the UE per unit time. The eNB may individually measure an uplink throughput in the communication with the UE and a downlink throughput in the communication with the UE. The eNB may measure the throughput per UE when the eNB receives the location information from each of plural UEs establishing connections with the eNB. Furthermore, the eNB may measure the throughput per radio access bearer of the UE. The throughput is measured for QoS verification. In addition to the throughput, as verification parameter of QoS, packet delay and latency (packet delay and loss rate) are exists.

In step S13, the UE starts the acquisition of location information based on the instruction information received from the eNB. The UE may periodically acquire the location information, or may acquire the location information by a trigger of occurrence of predetermined event.

In step S14, the UE transmits the location information acquired in the step S13. The eNB receives the location information from the UE.

In step S15, the eNB associates the location information received from the UE in the step S14 with the throughput measured in the unit time corresponding to the reception timing of the location information, and the records them. The information recorded at the eNB is notified to OAM, for example.

The base station measures the throughput and the user terminal acquires and transmits (reports) the location information, for the following reasons. The location information acquired by the user terminal is high accuracy and high reliability. Therefore, it is possible to identify areas where the QoS is deteriorated, with high accuracy. On the other hand, the network performs wrong optimization (e.g. scheduling optimization) if the location information is not reliable, and then QoS of entire system may be deteriorated.

Although the basic operation of the embodiment is described above, hereinafter, a description is given of improved operations of the mobile communication system of the embodiment.

(1) Operation Pattern 1

Figure 5:
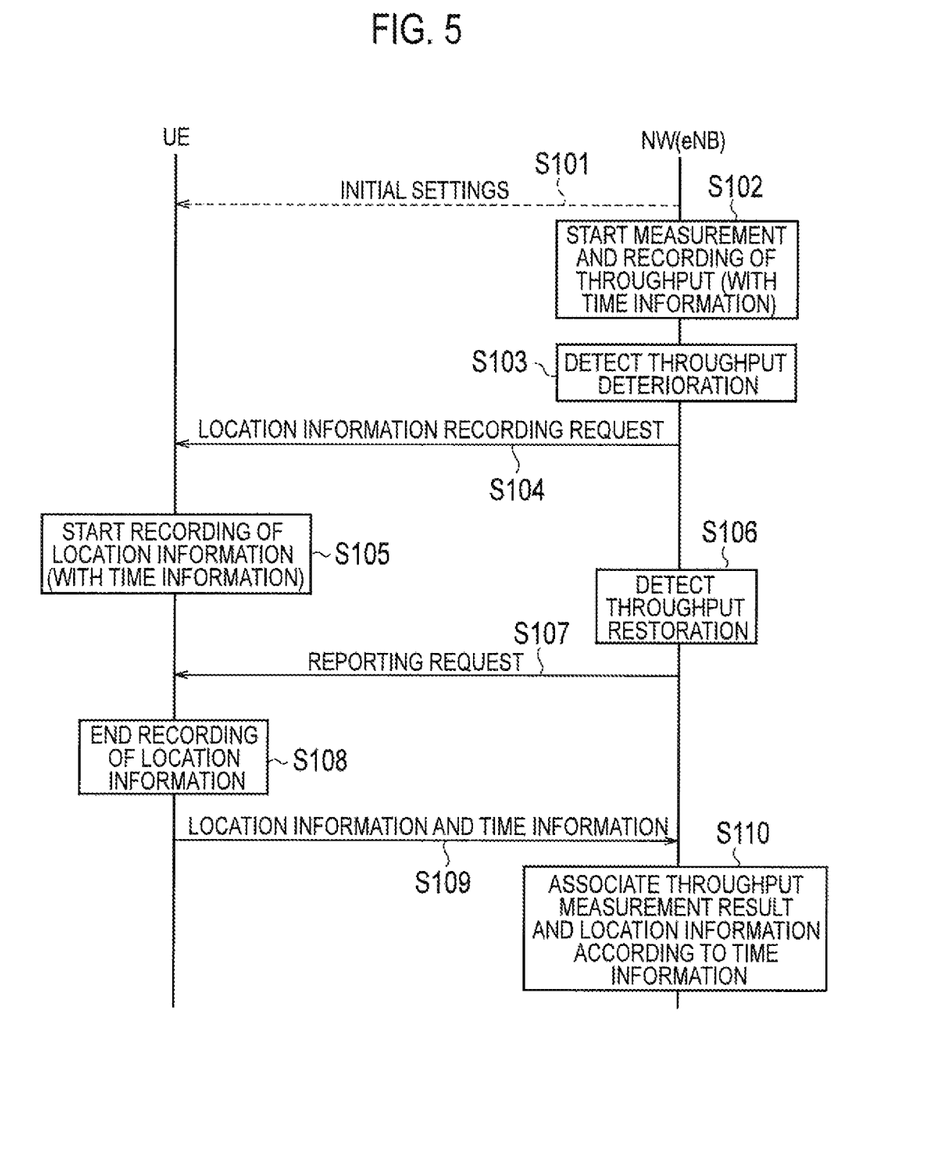
FIG. 5 shows operation pattern 1 of the mobile communication system of the embodiment of the present disclosure.

FIG. 5 shows operation pattern 1 of the mobile communication system. In the initial state in FIG. 5, the UE is connected to the eNB.

As shown in FIG. 5, in step S101, the eNB performs initial setting for communicating with the UE or performs initial setting for MDT. In the initial setting, the eNB may notify the UE of a network time. The network time is a time managed in the network. Upon receipt of the network time, the UE starts a relative-time timer. The relative-time timer is configured to count the time elapsed (relative time) from the received network time.

In step S102, the eNB starts measurement and recording of throughput of communication between itself and the UE. Specifically, the eNB measures throughput of communication between itself and the UE, and records the measurement result in association with the network time.

In step S103, the eNB detects deterioration in throughput of communication between itself and the UE. Deterioration in throughput refers to a state where the throughput becomes lower than a predetermined threshold, or where the throughput becomes lower than a throughput range estimated from the number of resource blocks and an MCS (Modulation and Coding Scheme) applied to the communication between the UE and the eNB. An MCS is defined by a combination of a modulation scheme and a coding scheme. A resource block is a unit of radio resource divided in the frequency direction. The eNB allocates one or multiple resource blocks to the UE.

In step S104, upon detection of the deterioration in throughput of communication between itself and the UE, the eNB sends the UE a request for recording location information. In the recording request, the eNB may notify the UE of the network time. Upon receipt of the network time, the UE starts the relative-time timer. The recording request may also include information specifying a time interval for recording location information.

In step S105, in response to the location information recording request from the eNB, the UE starts acquisition and recording of location information. Specifically, the UE acquires location information indicating its own geographical location, and records the acquired location information in association with time information (network time and relative time). Here, relative time is that counted by the relative-time timer at the time of acquiring the location information.

In step S106, the eNB detects restoration of throughput of communication between itself and the UE. Restoration of throughput refers to a state where the throughput becomes higher than the predetermined threshold, or where the throughput becomes higher than the throughput range estimated from the number of resource blocks or the MCS applied to the communication between the UE and the eNB.

In step S107, upon detection of the restoration of throughput of communication between itself and the UE, the eNB sends the UE a request for reporting location information.

In step S108, in response to the location information reporting request from the eNB, the UE ends recording of location information.

In step S109, in response to the location information reporting request from the eNB, the UE sends the eNB a report including at least one of recorded combinations of location information and time information.

In step S110, the eNB, MME, or OAM associates location information and a throughput measurement result assumed to have been acquired in the same time period. The two are associated according to a combination of location information and time information included in the report from the UE, and a combination of throughput measurement result and network time recorded by the eNB. As an association method, the UE and eNB (as well as a network entity associating the location information and measurement result) may each have a dedicated identifier which is added to a header or the like of the location information and measurement result, so that they may later be used in associating the location information and the measurement result. Alternatively, the network may identify the UE having sent the location information or measurement result according to the IP address, MAC address, or an allocated C-RNTI of the UE, to thereby associate the location information and the measurement result later.

The reason why the low throughput condition is targeted is described below. Although identification of overmuch throughput areas is one purpose of QoS verification, such areas do not directly influence the user experience. Therefore, it is preferable to target the low throughput condition.

(2) Operation Pattern 2

Figure 6:
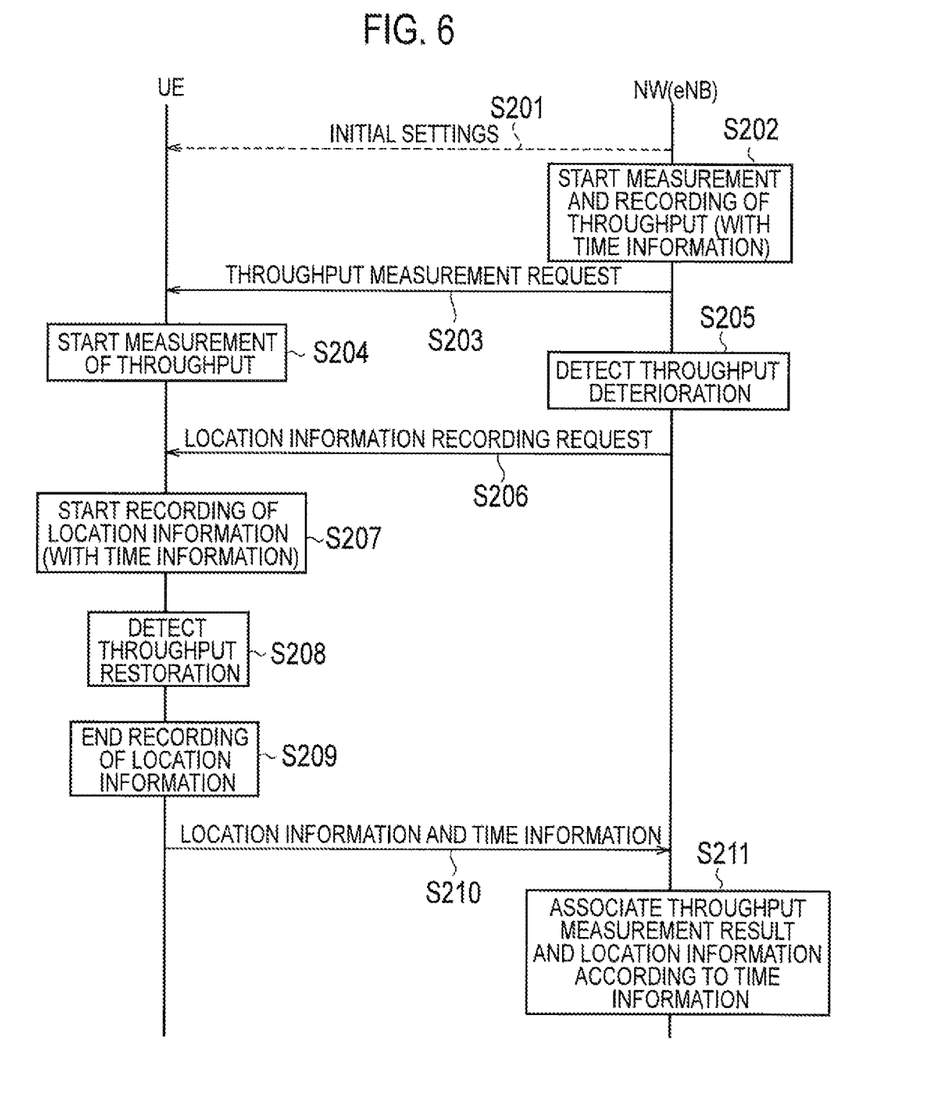
FIG. 6 shows operation pattern 2 of the mobile communication system of the embodiment of the present disclosure.

FIG. 6 shows operation pattern 2 of the mobile communication system. Although in operation pattern 1 the eNB detects throughput restoration, in this operation pattern, the UE detects throughput restoration. Note that descriptions of parts overlapping with the aforementioned operation pattern are omitted as appropriate.

As shown in FIG. 6, in step S201, the eNB performs initial setting for communicating with the UE or performs initial setting for MDT. In the initial setting, the eNB may notify the UE of a network time.

In step S202, the eNB starts measurement and recording of throughput of communication between itself and the UE. Specifically, the eNB measures throughput of communication between itself and the UE, and records the measurement result in association with the network time.

In step S203, the eNB sends the UE a request for measuring throughput. In the measurement request, the eNB may notify the UE of the network time.

In step S204, in response to the measurement request from the eNB, the UE starts measurement of throughput of communication between itself and the eNB.

In step S205, the eNB detects deterioration in throughput of communication between itself and the UE.

In step S206, upon detection of the deterioration in throughput of communication between itself and the UE, the eNB sends the UE a request for recording location information. In the recording request, the eNB may notify the UE of the network time.

In step S207, in response to the location information recording request from the eNB, the UE starts acquisition and recording of location information. Specifically, the UE acquires location information indicating its own geographical location, and records the acquired location information in association with time information (network time and relative time).

In step S208, the UE detects restoration of throughput of communication between itself and the eNB.

In step S209, upon detection of the restoration of throughput of communication between itself and the eNB, the UE ends recording of location information.

In step S210, upon detection of the restoration of throughput of communication between itself and the eNB, the UE sends the eNB a report including at least one of recorded combinations of location information and time information.

In step S211, the eNB, MME, or OAM associates location information and a throughput measurement result assumed to have been acquired in the same time period. The two are associated according to a combination of location information and time information included in the report from the UE, and a combination of throughput measurement result and network time recorded by the eNB.

(3) Operation Pattern 3

Figure 7:
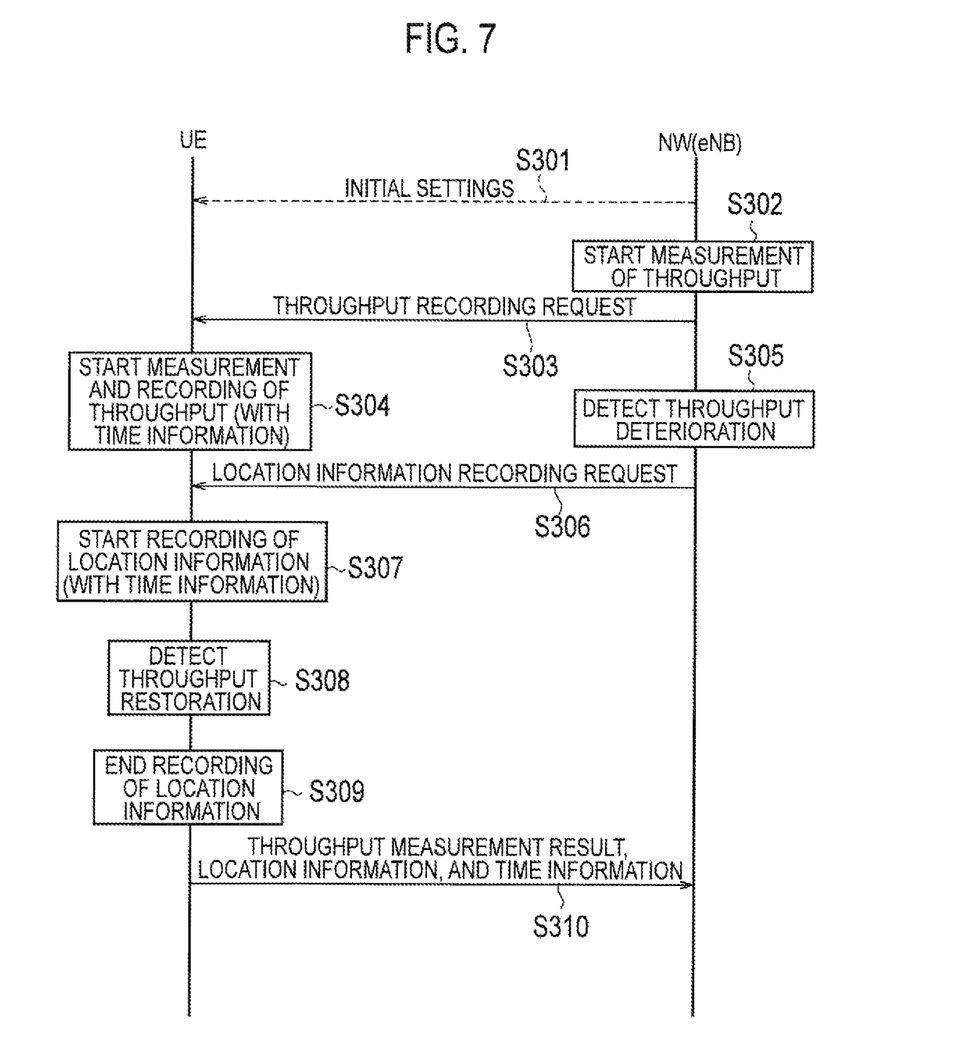
FIG. 7 shows operation pattern 3 of the mobile communication system of the embodiment of the present disclosure.

FIG. 7 shows operation pattern 3 of the mobile communication system. Although in operation patterns 1 and 2 the eNB records the throughput measurement result, in this operation pattern, the UE records the throughput measurement result. In addition, in this operation pattern, the UE detects throughput restoration. Note that descriptions of parts overlapping with the aforementioned operation patterns are omitted as appropriate.

As shown in FIG. 7, in step S301, the eNB performs initial setting for communicating with the UE or performs initial setting for MDT. In the initial setting, the eNB may notify the UE of a network time.

In step S302, the eNB starts measurement of throughput of communication between itself and the UE.

In step S303, the eNB sends the UE a request for recording throughput. In the recording request, the eNB may notify the UE of the network time.

In step S304, in response to the throughput recording request from the eNB, the UE starts measurement and recording of throughput of communication between itself and the eNB. Specifically, the eNB measures throughput of communication between itself and the UE, and records the measurement result in association with time information (network time and relative time). Note, however, that this recording is not essential, and may be omitted.

In step S305, the eNB detects deterioration in throughput of communication between itself and the UE.

In step S306, upon detection of the deterioration in throughput of communication between itself and the UE, the eNB sends the UE a request for recording location information. In the recording request, the eNB may notify the UE of the network time.

In step S307, in response to the location information recording request from the eNB, the UE starts acquisition and recording of location information. Specifically, the UE acquires location information indicating its own geographical location, and records the acquired location information in association with the throughput measurement result and time information (network time and relative time).

In step S308, the UE detects restoration of throughput of communication between itself and the eNB.

In step S309, upon detection of the restoration of throughput of communication between itself and the eNB, the UE ends recording of location information.

In step S310, upon detection of the restoration of throughput of communication between itself and the eNB, the UE sends the eNB a report including at least one of combinations of throughput measurement result, location information, and time information.

(4) Operation Pattern 4

Figure 8:
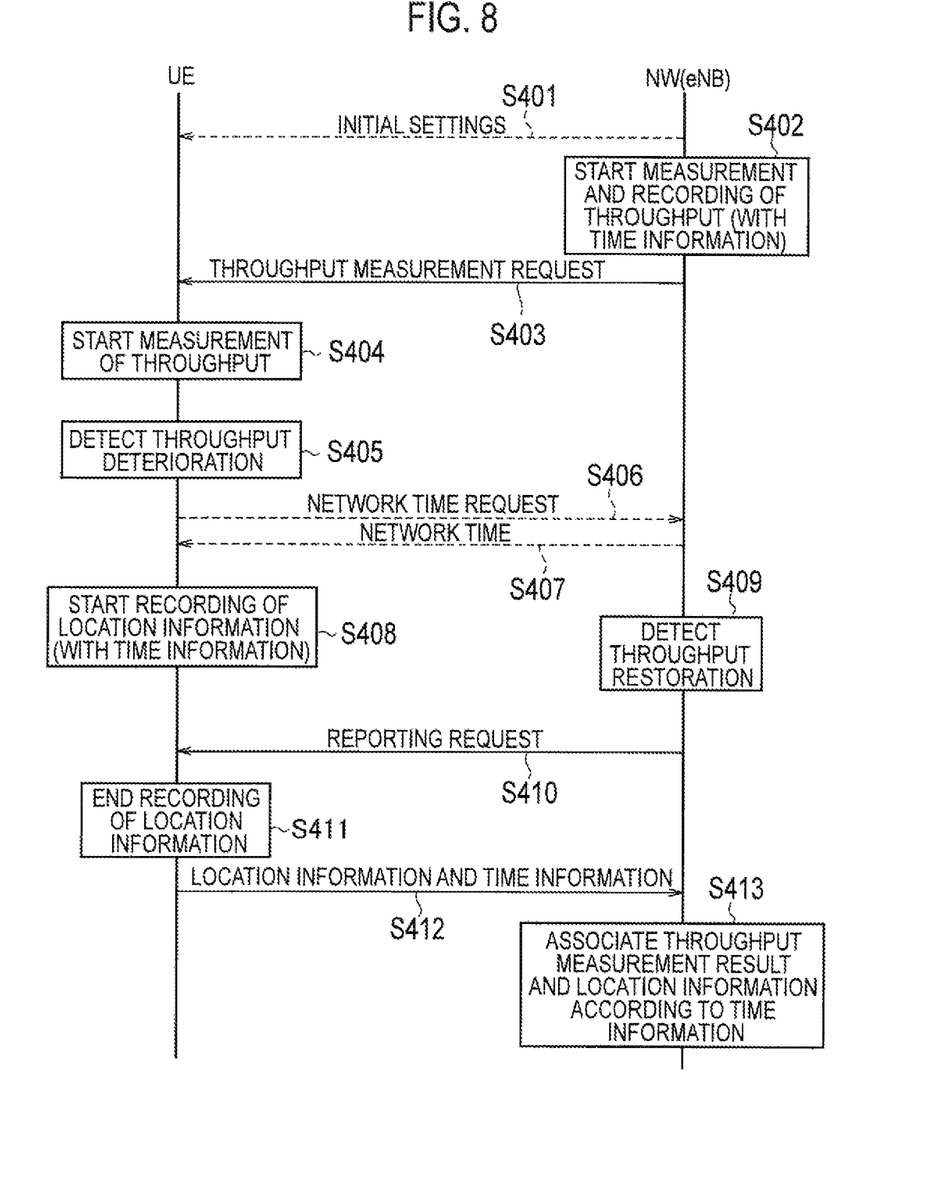
FIG. 8 shows operation pattern 4 of the mobile communication system of the embodiment of the present disclosure.

FIG. 8 shows operation pattern 4 of the mobile communication system. Although in operation patterns 1 to 3 the eNB detects throughput deterioration, in this operation pattern, the UE detects throughput deterioration. Note that descriptions of parts overlapping with the aforementioned operation patterns are omitted as appropriate.

As shown in FIG. 8, in step S401, the eNB performs initial setting for communicating with the UE or performs initial setting for MDT. In the initial setting, the eNB may notify the UE of a network time.

In step S402, the eNB starts measurement and recording of throughput of communication between itself and the UE. Specifically, the eNB measures throughput of communication between itself and the UE, and records the measurement result in association with the network time.

In step S403, the eNB sends the UE a request for measuring throughput. In the measurement request, the eNB may notify the UE of the network time.

In step S404, in response to the measurement request from the eNB, the UE starts measurement of throughput of communication between itself and the eNB.

In step S405, the UE detects deterioration in throughput of communication between itself and the eNB.

In step S406, if the network time is not received from the eNB, the UE sends the eNB a request for notification of the network time.

In step S407, in response to the network time notification request, the eNB notifies the UE of the network time.

In step S408, the UE starts acquisition and recording of location information. Specifically, the UE acquires location information indicating its own geographical location, and records the acquired location information in association with time information (network time and relative time).

In step S409, the eNB detects restoration of throughput of communication between itself and the UE.

In step S410, upon detection of the restoration of throughput of communication between itself and the UE, the eNB sends the UE a request for reporting location information.

In step S411, in response to the location information reporting request from the eNB, the UE ends recording of location information.

In step S412, in response to the location information reporting request from the eNB, the UE sends the eNB a report including at least one of recorded combinations of location information and time information.

In step S413, the eNB, MME, or OAM associates location information and a throughput measurement result assumed to have been acquired in the same time period. The two are associated according to a combination of location information and time information included in the report from the UE, and a combination of throughput measurement result and network time recorded by the eNB.

(5) Operation Pattern 5

Figure 9:
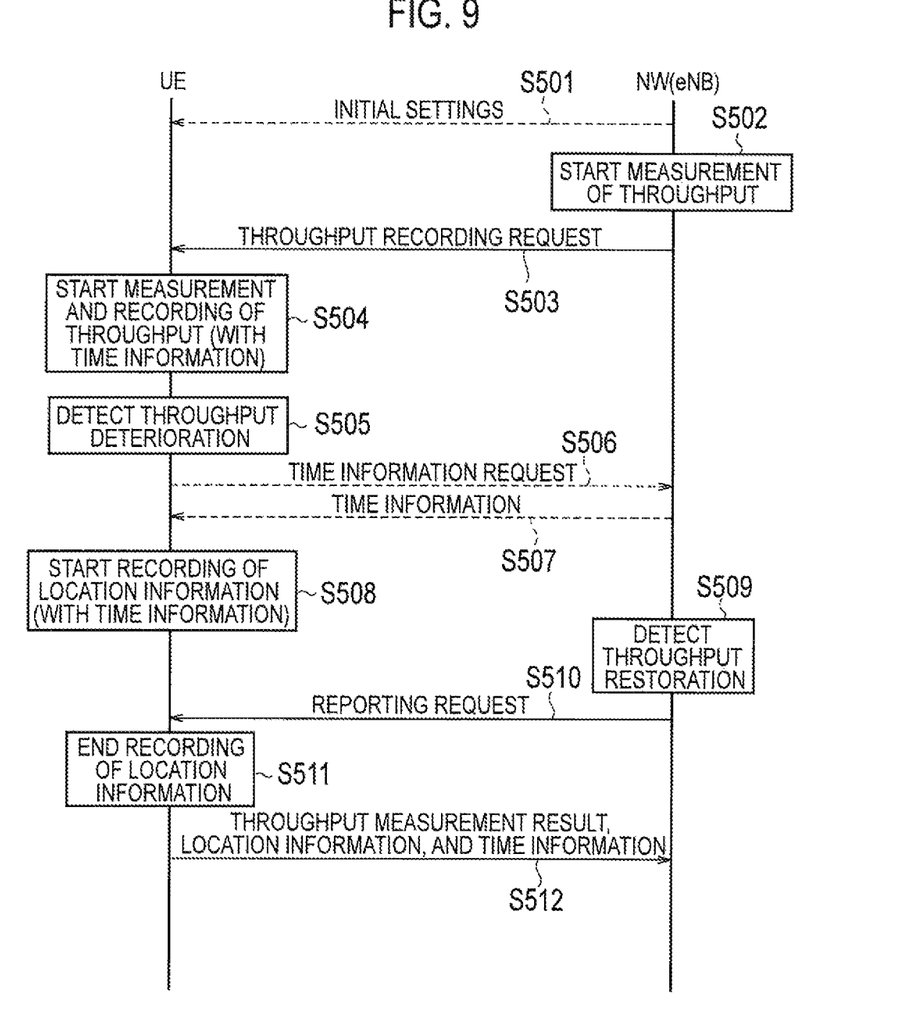
FIG. 9 shows operation pattern 5 of the mobile communication system of the embodiment of the present disclosure.

FIG. 9 shows operation pattern 5 of the mobile communication system. In this operation pattern based on operation pattern 4, the UE records the throughput measurement result. Note that descriptions of parts overlapping with the aforementioned operation patterns are omitted as appropriate.

As shown in FIG. 9, in step S501, the eNB performs initial setting for communicating with the UE or performs initial setting for MDT. In the initial setting, the eNB may notify the UE of a network time.

In step S502, the eNB starts measurement of throughput of communication between itself and the UE.

In step S503, the eNB sends the UE a request for recording throughput. In the recording request, the eNB may notify the UE of the network time.

In step S504, the UE starts measurement and recording of throughput of communication between itself and the eNB. Specifically, the UE measures throughput of communication between itself and the eNB, and records the measurement result in association with time information (network time and relative time).

In step S505, the UE detects deterioration in throughput of communication between itself and the eNB.

In step S506, if the network time is not received from the eNB, the UE sends the eNB a request for notification of the network time.

In step S507, in response to the network time notification request, the eNB notifies the UE of the network time.

In step S508, the UE starts acquisition and recording of location information. Specifically, the UE acquires location information indicating its own geographical location, and records the acquired location information in association with the throughput measurement result and time information (network time and relative time).

In step S509, the eNB detects restoration of throughput of communication between itself and the UE.

In step S510, upon detection of the restoration of throughput of communication between itself and the UE, the eNB sends the UE a request for reporting location information.

In step S511, in response to the location information reporting request from the eNB, the UE ends recording of location information.

In step S512, in response to the location information reporting request from the eNB, the UE sends the eNB a report including at least one of combinations of throughput measurement result, location information and time information.

(6) Operation Pattern 6

Figure 10:
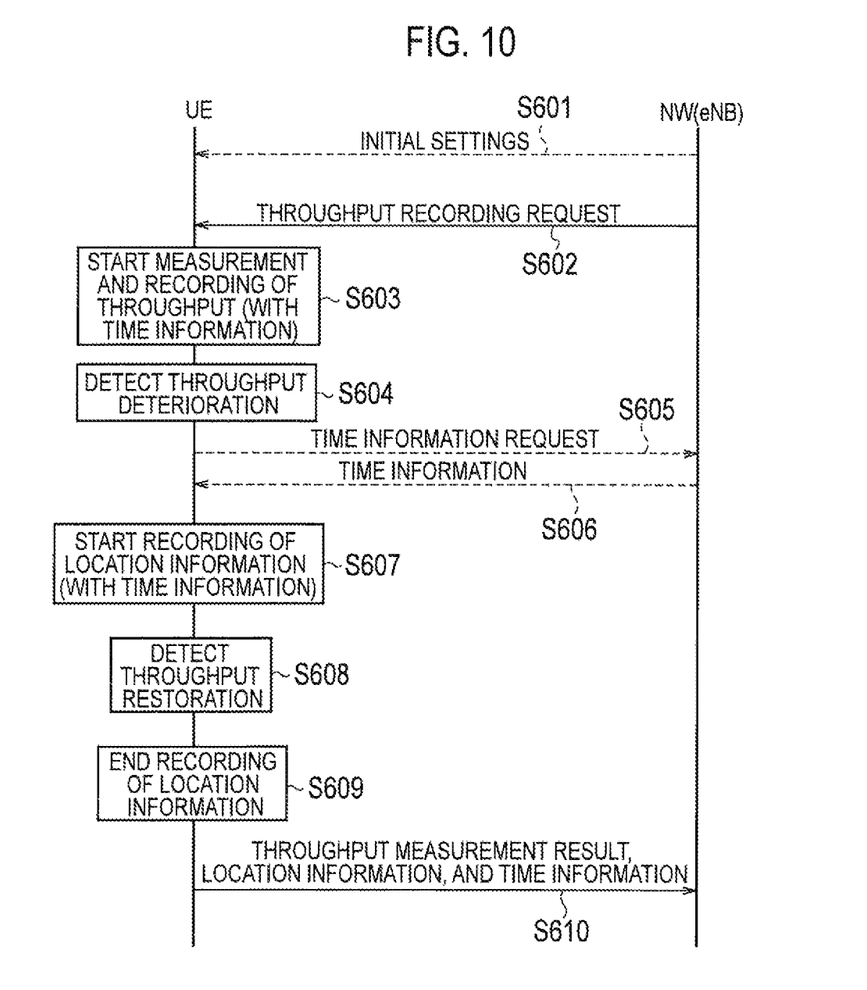
FIG. 10 shows operation pattern 6 of the mobile communication system of the embodiment of the present disclosure.

FIG. 10 shows operation pattern 6 of the mobile communication system. In this operation pattern based on operation pattern 5, the UE detects throughput restoration. Note that descriptions of parts overlapping with the aforementioned operation patterns are omitted as appropriate.

As shown in FIG. 10, in step S601, the eNB performs initial setting for communicating with the UE or performs initial setting for MDT. In the initial setting, the eNB may notify the UE of a network time.

In step S602, the eNB sends the UE a request for recording throughput. In the recording request, the eNB may notify the UE of the network time.

In step S603, the UE starts measurement and recording of throughput of communication between itself and the eNB. Specifically, the UE measures throughput of communication between itself and the eNB, and records the measurement result in association with time information (network time and relative time). Note, however, that this recording is not essential, and may be omitted.

In step S604, the UE detects deterioration in throughput of communication between itself and the eNB.

In step S605, if the network time is not received from the eNB, the UE sends the eNB a request for notification of the network time.

In step S606, in response to the network time notification request, the eNB notifies the UE of the network time.

In step S607, the UE starts acquisition and recording of location information. Specifically, the UE acquires location information indicating its own geographical location, and records the acquired location information in association with the throughput measurement result and time information (network time and relative time).

In step S608, the UE detects restoration of throughput of communication between itself and the eNB.

In step S609, upon detection of the restoration of throughput of communication between itself and the eNB, the UE ends recording of location information.

In step S610, the UE sends the eNB a report including at least one of combinations of throughput measurement result, location information and time information.

INDUSTRIAL APPLICABILITY

As described, the present disclosure enables QoS verification by MDT, and therefore is useful in radio communications field such as mobile communications.

The invention claimed is:

1. A communication control method used in a mobile communication system supporting immediate MDT (Minimization of Drive Test), comprising:
    receiving an instruction from a base station, by a user terminal being in a radio resource control (RRC) connected state in a cell of the base station;
    acquiring, by the user terminal being in the RRC connected state, location information indicating a location of the user terminal based on the instruction from the base station;
    measuring, by the user terminal, an uplink packet delay of uplink communication with the base station;
    comparing, by the user terminal being in the RRC connected state, a value of the measured uplink packet delay with a packet delay threshold value;
    determining, by the user terminal being in the RRC connected state, whether to transmit a report to the base station based on result of the comparing, the report including information on the measured uplink packet delay;
    reporting, by the user terminal, the report to the base station in a case that the user terminal determines to transmit the report to the base station; and
    not reporting, by the user terminal, the report to the base station in a case that the user terminal determines not to transmit the report to the base station.

2. The communication control method according to claim 1, wherein
    the determining includes determining not to transmit the report in response to the value of the measured uplink packet delay not exceeding the packet delay threshold value.

3. A user terminal that establishes a connection with a base station in a mobile communication system supporting immediate MDT (Minimization of Drive Test), comprising:
    a controller containing a processor, and configured to cause the user terminal to execute processes of:
        receiving an instruction from a base station, by the user terminal being in a radio resource control (RRC) connected state in a cell of the base station;
        acquiring, while in the RRC connected state, location information indicating a location of the user terminal based on the instruction from the base station;
        measuring an uplink packet delay of uplink communication with the base station;
        comparing, while in the RRC connected state, a value of the measured uplink packet delay with a packet delay threshold value;
        determining, while in the RRC connected state, whether to transmit a report to the base station based on result of the comparing, the report including information on the measured uplink packet delay;
        reporting, by the user terminal, the report to the base station in a case that the user terminal determines to transmit the report to the base station; and
        not reporting, by the user terminal, the report to the base station in a case that the user terminal determines not to transmit the report to the base station.

* * * * *